Feb. 25, 1969 A. ALTMANN 3,429,987

MATRIX CIRCUIT FOR A COLOR TELEVISION RECEIVER

Filed Sept. 16, 1965 Sheet 1 of 3

Inventor:
Albrecht Altmann
by Michael J. Striker

Inventor:
Albrecht Altmann
by Michael J. Striker
Attorney

Inventor:

Albrecht Altmann by Michael J. Striker

Atty.

3,429,987

MATRIX CIRCUIT FOR A COLOR TELEVISION RECEIVER

Albrecht Altmann, Hildesheim, Germany, assignor to Blaupunkt-Werke, G.m.b.H., Hildesheim, Germany Filed Sept. 16, 1965, Ser. No. 487,882

Claims priority, application Germany, Sept. 19, 1964, B 78,604

U.S. Cl. 178—5.4 32 Claims

Int. Cl. H04n *9/32, 9/54*

ABSTRACT OF THE DISCLOSURE

Basic colors signals R, G, B for controlling the corresponding control grids of a three beam color television tube are provided from the R—Y and B—Y signals and the luminance signal. The latter signals are each fed to the base of a corresponding transistor. A bridge circuit has one terminal connected to the emitter of the R—Y transistor, a second terminal connected to the emitter of the B—Y transistor, a third terminal connected via a timing device to the emitter of the luminance transistor and a fourth terminal for furnishing the G signal. The R—Y and B—Y transistor collectors are each connected via a corresponding load resistance to ground. The voltage at each of these collectors corresponds to the R and B signal respectively. Different compensating means for compensating for extraneous color signals coupled between the R and B stages are also shown.

The present invention relates to a matrix circuit for a color television receiver. More particularly, the invention relates to a matrix circuit for providing three basic color signals from two color difference signals relative to the brightness or luminance signal.

Usually, in the transmission of color television pictures, two signal voltages are simultaneously produced in the transmitter. One of the signal voltages incorporates or corresponds to the brightness or luminance Y and the other incorporates or corresponds to the color content of the picture. The signal voltages comprise color symbol voltages which represent the red, R, green, G, and blue B color components of the picture. During transmission, the brightness signal Y is included in a combination of three signals, red, green and blue. The color symbol voltages modulate a carrier wave in the form of color difference voltages. The three color difference voltages are combined to form two color symbol voltages, and the carrier wave is modulated at different phase 90° apart by the two color symbol voltages. The two modulating voltages, which are non-coincident in phase with any of the three color difference voltages, are generally known as the I voltage and the Q voltage. The color difference voltages which represent the color components of the picture are generally known as R—Y. G—Y and B—Y.

In the receiver, the two modulating voltages of the carrier wave are usually separated from each other and demodulated, so that the I and Q voltages or the R—Y and B—Y voltages are provided. In order to control the picture tube for reproducing the color picture from the modulated signals, a matrix circuit is usually utilized to suitably combine the demodulated signals to provide the three color difference voltages R—Y, G—Y and B—Y. The color difference voltages or signals are applied to the proper control electrodes, of a triple beam color tube after suitable amplification. The brightness voltage or signal is amplified and applied to other control electrodes of the tube such as, for example, the cathode. The provision of the color difference voltages involves complicated and expensive circuitry which increases considerably the cost of the receiver.

The principal object of the present invention is to provide a new and improved matrix circuit for a color television receiver.

An object of the present invention is to provide a matrix circuit for a color television receiver which is of simple structure and low cost, but which functions efficiently, effectively and reliably.

In accordance with the present invention, a matrix circuit for a color television receiver provides three basic color signals from two color difference signals relative to a luminance signal. The matrix circuit comprises a first color control for producing a basic first color signal from a first color difference signal and a luminance signal. The first color control has an input for receiving the first color difference signal, an input-output for producing the first color difference signal and for receiving the luminance signal and an output for providing the basic first color signal. A second color control produces a basic second color signal from a second color difference signal and the luminance signal. The second color control has an input for receiving the second color difference signal, an input-output for providing the second color difference signal and for receiving the luminance signal and an output for providing the basic second color signal. A bridge circuit comprises a plurality of resistors connected to each other in a determined network pattern. Each of the resistors has a determined resistance value. The bridge circuit produces a basic third color signal from the first and second color difference signals and the luminance signal. The bridge circuit has an input for receiving the luminance signal, a first input-output connected to the input-output of the first color control for providing the luminance signal and for receiving the first color difference signal, a second input-output connected to the input-output of the second color control for providing the luminance signal and for receiving the second color difference signal and an output for providing the basic third color signal. A luminance signal sources applies the luminance signal to the input of the bridge circuit. A first color difference signal source applies the first color difference signal to the input of the first color control. A second color difference signal source applies the second color difference signal to the input of the second color control.

In order that the invention may be readily carried into effect, it will now be described with reference to the accompanying drawings, wherein.

Figure 4:
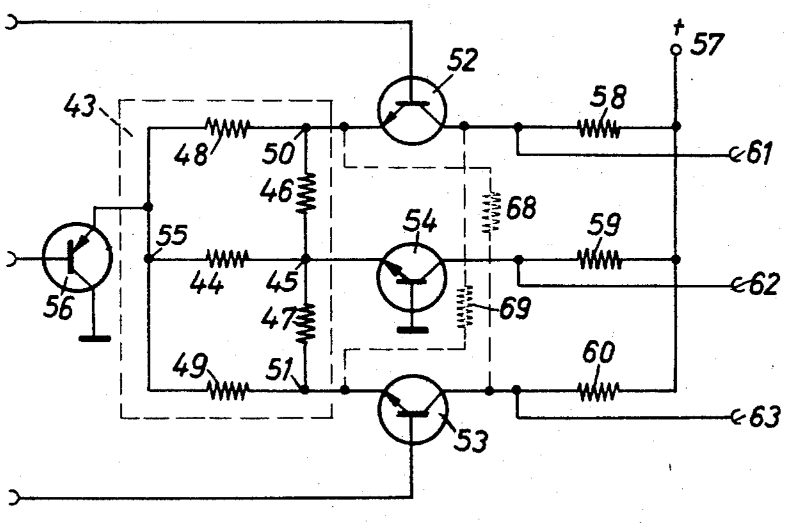
FIG. 4 is a circuit diagram of another embodiment of the matrix circuit of the present invention.
Figure 6:
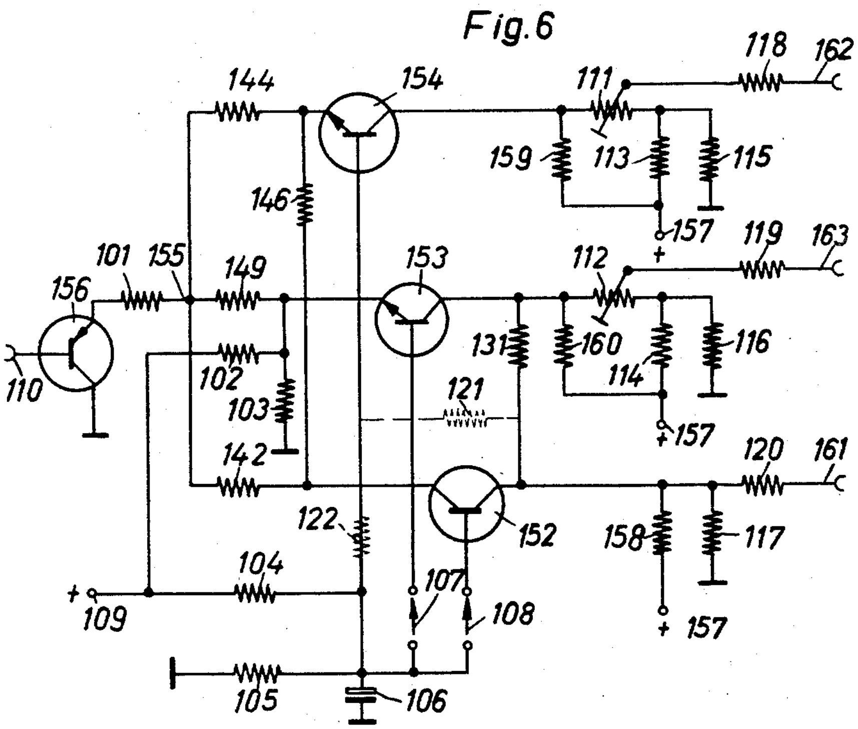

FIGS. *5a* and *5b* are vector diagrams for explaining the operation of the circuit of FIG. 4; and FIG. 6 is a circuit diagram of still another embodiment of the matrix circuit of the present invention.

Figure 1:
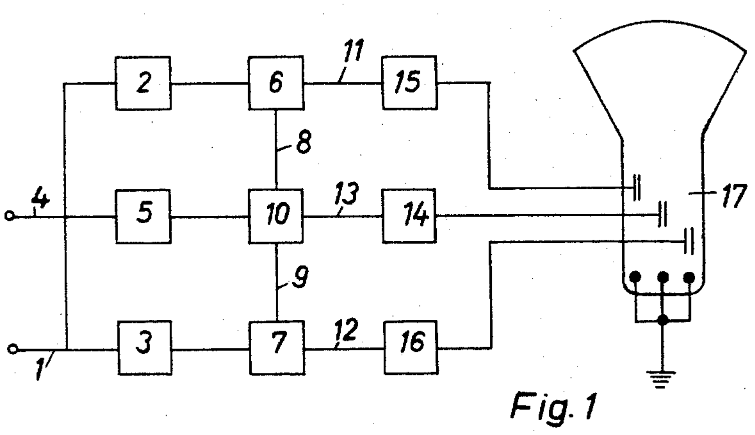
FIG. 1 is a block diagram of an embodiment of a color television receiver including the matrix circuit of the present invention.

In the color television receiver of FIG. 1, the modulated carrier is received at an input terminal 1 and is fed to an *R—Y* demodulator 2 via conductor 1*a* and a conductor 1*b* and to a *B—Y* demodulator 3 via the conductor 1*a* and a conductor 1*c*. The luminance signal Y is received at an input terminal 4 and is fed to a luminance stage 5 via a conductor 4*a*.

The *R—Y* signal provided by the *R—Y* demodulator 2 is fed to an input of a color deriving stage 6 via conductor 2*a* and the $B-Y$ signal provided by the $B-Y$ demodulator 3 is fed to an input of a color deriving stage 7 via a conductor 3*a*. The Y signal provided by the luminance stage 5 is fed to an input of a matrix circuit 10 via conductor 5*a* and via said matrix circuit and conductors 8 and 9 to the color deriving stages 6 and 7, respectively. The Y signals supplied to the color deriving stages 6 and 7 are of such relative phase and magnitude that said color deriving stages provide the basic color signals R and B, respectively. Thus, the basic color signal R is provided in a conductor 11 at the output of the color deriving stage 6 and the basic color signal B is provided in a conductor 12 at the output of the color deriving stage 7.

The basic color signal R is also provided in the conductor 8 and is fed thereby to the matrix circuit 10. The basic color signal B is also provided in the conductor 9 and is fed thereby to the matrix circuit 10 to form the third basic color signal G. The basic color signal G is fed to a color output stage 14 via conductor 13 from an output of the matrix circuit 10. The basic color signal R is fed to a color output stage 15 via the conductor 11. The basic color signal B is fed to a color output stage 16 via the conductor 12. Each of the color output stages controls a corresponding control grid of the triple beam color picture tube 17.

Figure 2:
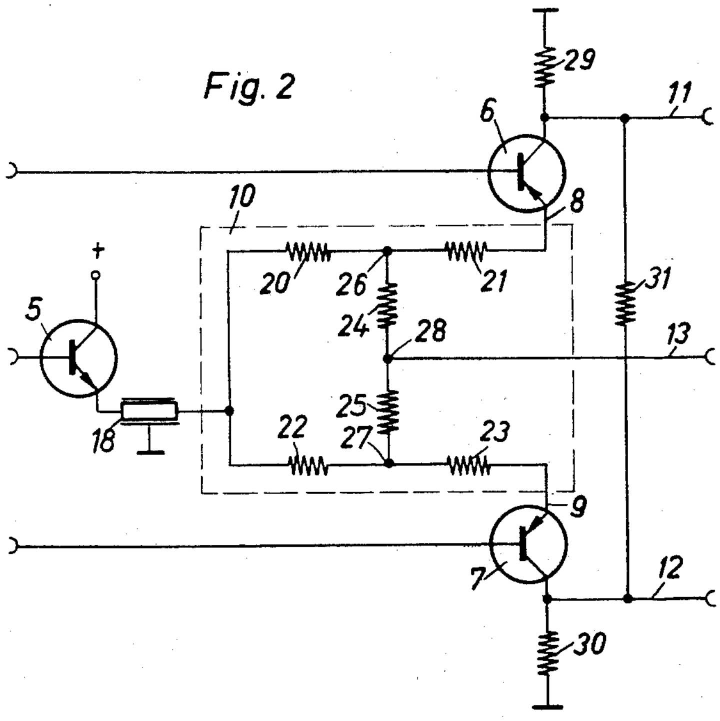
FIG. 2 is a circuit diagram of an embodiment of the matrix circuit of the present invention.

In FIG. 2, an embodiment of the matrix circuit 10 is shown connected with the luminance stage 5 and the color deriving stages 6 and 7. The luminance stage is connected to the matrix circuit 10 via a timer 18 connected in the conductor 5*a*. The timer 18 may comprise any suitable time control component such as, for example, a delay line, a capacitor, an inductor or the like. The timer 18 functions to conform the phase of the luminance signal with the phase of the color difference signals.

The matrix circuit 10 of FIG. 2 comprises two T-type resistance networks connected in a bridge. One T-type resistance network comprises a trunk resistor 24 and spaced head resistors 20 and 21 on opposite sides of the trunk; the trunk joining the head at a connection point 26 between the head resistors 20 and 21. The other T-type resistance network comprises a trunk resistor 25 and spaced head resistors 22 and 23 on opposite sides of the trunk; the trunk joining the head at a connection point 27 between the head resistors 22 and 23.

The head resistors 20 and 22 are connected together, as are the trunk resistors 24 and 25. The trunk resistors 24 and 25 are connected at a common connection point 28. The luminance signal conductor 5*a* is connected to a common point in the connection between the head resistors 20 and 22 of the T-type resistance networks. The other head resistor 21 on the one network is connected to the color deriving stage 6 via the conductor 8 and the other head resistor 23 of the other network is connected to the color deriving stage 7 via the conductor 9. The conductor 13 for the basic color signal G is connected to the common connection point 28 of the trunk resistors 24 and 25 of the networks. The luminance stage 5 may comprise an NPN transistor and each of the color deriving stages 6 and 7 may comprise a PNP transistor.

The color difference signal $R-Y$ is applied to the base electrode of the transistor of the color deriving stage 6 Y and the color difference signal $B-Y$ is applied to the base electrode of the transistor of the color deriving stage 7. The luminance signal Y, which is identical in magnitude with the Y signal of each color difference signal, is applied to the emitter electrode of the transistor of the color deriving stage 6 and to the emitter electrode of the transistor of the color deriving stage 7. The luminance signal Y is applied to the each color deriving stage 6 and 7 via the matrix circuit 10 and the conductors 8 and 9, respectively.

The signals applied to the base and emitter electrodes of the transistor of each of the color deriving stages 6 and 7 provide a control current for the R signal in the base-emitter path of the transistors of the color deriving stage 6 and a control current for the B signal in the base-emitter path of the transistor of the color deriving stage 7. A collector resistor 29 is connected between the collector electrode of the transistor of the color deriving stage 6 and a point at ground potential and a collector resistor 30 is connected between the collector electrode of the transistor of the color deriving stage 7 and a point at ground potential.

The control current for the R signal in the transistor of the color deriving stage 6 produces a change in collector current which produces a voltage drop across the collector resistor 29 and also across the associated resistors of the matrix circuit 10 and the relatively small internal resistance of the transistor of the luminance stage 5, such associated resistors functioning as emitter resistors. The control current for the B signal in the transistor of the color deriving stage 7 produces a change in collector current which produces a voltage drop across the collector resistor 30 and also across the associated resistors of the matrix circuit 10 and the internal resistance of the transistor of the luminance stage 5, such associated resistors functioning as emitter resistors. The emitter electrode of the transistor of the luminance stage 5 is connected to the matrix circuit 10, the base electrode of said transistor functioning as the input to said luminance stage and a positive potential being applied to the collector electrode of said transistor.

The voltage drops across the resistors of the matrix circuit 10 are combined to provide at the common connection point 28 the basic color signal G by the provision of suitable resistance values for said resistors and with the assistance of the Y signal. The color deriving stages 6 and 7 are connected in parallel and the luminance stage 5 is connected in series with said color deriving stages, as far as the operating voltages are connected.

In order to determine the resistance values for the resistors of the matrix circuit 10, it is preferable to assume that a basic color signal, particularly the green color signal G, is devoid of extraneous signal portions. That is, it is assumed that no signal portions of another color signal are present in the green color signal G which are not necessary for forming the green color signal. Signal portions of other color signals in the conductors 11 and 12, which may interfere with the green color signal G in the conductor 13, may be maintained at very small magnitudes or may be compensated by, for example, a resistor 31 connected between and bridging the conductors 11 and 12.

The resistance values of the resistors of the matrix circuit 10 of FIG. 2 may be determined as follows:

It is assumed that the modulation of the carrier for color picture transmission is such that the following modulation relationship is provided:

$$Y=0.299R+0.587G+0.144B \tag{1}$$

The relationship at the common connection point 28 is desired to be $$0.587G=Y-0.299R-0.144B \tag{2}$$

In order to simplify the calculations, the internal resistance of each of the luminance stage 5, the color deriving stage 6 and the color deriving stage 7, and the emitter input resistances of the transistors of said color deriving stages are disregarded. That is, $$Ri5=Ri6=Ri7=0 \tag{3}$$

$$Re6=Re7=0 \tag{4}$$

where R*i*5 is the internal resistance of the luminance stage 5, R*i*6 is the internal resistance of the color deriving stage 6, R*i*7 is the internal resisitance of the color deriving stage 7, R*e*6 is the emitter input resistance of the transistor of the color deriving stage 6 and R*e*7 is the emitter input resistance of the transistor of the color deriving stage 7. These resistances are very small and may be included in the associated resistors of the matrix circuit 10. Thus, the resistance $Re6$ may be included in the resistor 21 and the resistance $Re7$ may be included in the resistor 23.

The resistance of the resistors 20, 21, 22, 23, 24, 25, 29, 30 and 31, respectively, are denoted by R20, R21, R22, R23, R24, R25, R29, R30 and R31, respectively. The calculations may be further simplified by the following relationships:

(5a) $R20=R22$ (5b) $R21-R23$ (5c) $R29=R30$

These simplications in the calculations result in the following resistance value determining relationships:

$$\frac{R20}{R21}=\frac{1-0.587}{0.587}=0.705$$

(7)
$$\frac{R25+\frac{(R20)(R21)}{R20+R21}}{R24+\frac{(R20)(R21)}{R20+R21}}=\frac{0.299}{0.144}=2.62$$

(8)
$$R29=R30=0.587\ (R20+R21)$$

Extraneous signal portions in the conductors 11 and 12 may be compensated if (9)
$$R31=\left(\frac{0.587}{0.299}\right)(R21)\left(1+\frac{R25}{R20}+\frac{R25}{R21}\right)$$

Each of the color deriving stages 6 and 7 has an amplification factor V. If the amplification factor V is taken into consideration,

(10)
$$R29=R30=V(R20+R21)$$

(11)
$$R31=\frac{V}{0.299}(R21)\left(1+\frac{R25}{R20}+\frac{R25}{R21}\right)$$

If the input signal to the color deriving stage 6 in the conductor 2a is $-(R-Y)$, the input signal to the color deriving stage 7 in the conductor 3a is $-(B-Y)$, and the input signal to the luminance stage 5 in the conductor 4a is +Y, the basic color signal provided in the conductor 11 is 0.587R, the basic color signal provided in the conductor 12 is 0.587B and the basic color signal provided in the conductor 13 is 0.587G.

Figure 3:
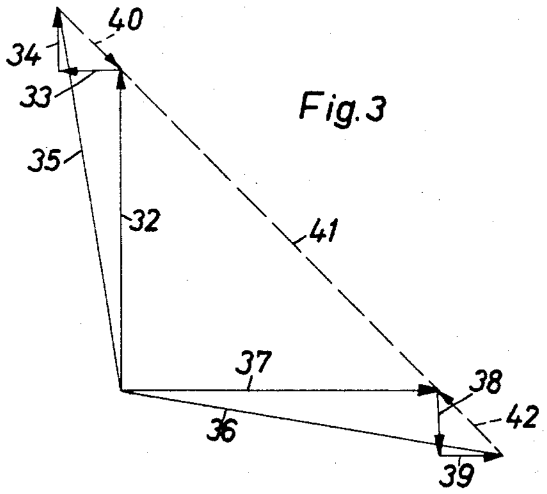
FIG. 3 is a vector diagram for explaining the operation of the circuit of FIG. 2.

FIG. 3 illustrates the compensating effect of the resistor 31. If there were no compensation for extraneous signal portions a voltage 32 would be provided in the conductor 11 resulting from the red color signal due to the resistor 20 at the resistor 29, that is (I red) (R29). A voltage 33 resulting from the blue color signal due to the resistors 24 and 25 at the resistor 29, or (I blue) (R29), is superimposed upon the voltage 32, as is a voltage 34 resulting from the red color signal due to the resistors 24 and 25 at the resistor 29, that is (I red) (R29). The resultant sum voltage 35 of the voltages 32, 33 and 34 includes a blue color portion. Similarly, without compensation for extraneous signal portions, a voltage 37 would be provided in the conductor 12 resulting from the blue color signal due to the transistor 22 at the resistor 30, that is (I blue) (R30). A voltage 38 resulting from the red color signal due to the resistors 24 and 25 at the resistor 30, or (I red) (R30), is superimposed upon the voltage 37, as is a voltage 39 resulting from the blue color signal due to the resistors 24 and 25 at the resistor 30, that is (I blue) (R30). The resultant sum voltage 36 of the voltages 37, 38 and 39 includes a red color portion.

Current flowing through the resistor 31 produces a voltage drop 40 across the resistor 29, a voltage drop 41 across such resistor 31 and a voltage drop 42 across the resistor 30. The resultant sum voltage 35 is thus reduced to the voltage 32 by the voltage 40 thereby compensating for the blue color portion in the red color signal in the conductor 11 and the resultant sum voltage 36 is thus reduced to the voltage 37 by the voltage 42 thereby compensating for the red color portion in the blue color signal in the conductor 12.

FIG. 4 illustrates another embodiment of the matrix circuit of the present invention. In the embodiment of FIG. 4, the color deriving stages 6 and 7 of FIGS. 1 and 2 are utilized as the color output stages 15 and 16, respectively, of FIG. 1. This permits the provision of varying output voltages by control of the transistors. FIG. 4 is a variation from FIG. 2. The luminance stage 56 is connected to the matrix circuit 43 via a conductor 56a and said matrix circuit is connected with the color output stages 52 and 53.

The matrix circuit 43 of FIG. 4 comprises two π-type resistance networks connected in a bridge. One π-type resistance network comprises a head resistor 46 and two trunk resistors 44 and 48 connected to opposite sides of the head resistor 46; the trunk resistor 44 joining the head resistor 46 at a common connection point 45 and the trunk resistor 48 joining the head resistor 46 at a common connection point 50. The other π-type resistance network comprises a head resistor 47 and two trunk resistors 44 and 49 connected to opposite sides of the head resistor 47; the trunk resistor 44 joining the head resistor at a common connection point 45 and the trunk resistor 49 joining the head resistor 47 at a common connection point 51.

The head resistors 46 and 47 are connected together, as are the trunk resistors 44, 48 and 49. The head resistors 46 and 47 are connected at a common connection point 45 and the trunk resistors 44, 48 and 49 are connected at a common connection point 55. The trunk resistor 44 is thus common to both π-type resistance networks. The luminance signal conductor 56a is connected to a common point in the connection between the trunk resistors 44, 48 and 49 of the π-type networks. The common connection point 50 is connected to the color output stage 52 via the emitter electrode of the NPN transistor comprising said color output stage. The color output stage 52 functions as the red output stage. The common connection point 51 is connected to the color output stage 53 via the emitter electrode of the NPN transistor comprising said color output stage. The color output stage 53 functions as the blue output stage. The common connection point 45 is connected to the color output stage 54 via the emitter electrode of the NPN transistor comprising said color output stage. The color output stage 54 functions as the green output stage.

The luminance stage 56 comprises a PNP transistor, The color difference signal $R-Y$ is applied to the base electrode of the transistor of the color output stage 52 and the color difference signal $B-Y$ is applied to the base electrode of the transistor of the color output stage 53. The luminance signal Y, which on that point is identical in magnitude with the Y signal of each color difference signal, is applied to the emitter electrode of the transistor of the color output stage 52 and to the emitter electrode of the transistor of the color output stage 53. The luminance signal is applied to each color output stage 52 and 53 via the matrix circuit 43.

The emitter current of the color output stages 52, 53 and 54 flows through the transistor of the luminance stage 56 during operation. The operating voltage of the color output stages 52, 53 and 54 is supplied by a positive potential applied to a terminal 57 and is applied to the transistor of the stage 52 via a collector resistor 58 connected between said terminal and the collector electrode of said transistor. The operating voltage is applied to the transistor of the stage 53 via a collector resistor 60 connected between the terminal 57 and the collector electrode of said transistor. The operating voltage is applied to the transistor of the stage 54 via a collector resistor 59 connected between the terminal 57 and the collector electrode of said transistor.

The base electrode of the transistor of the color output stage 54 is connected to a point at ground potential for luminance and color difference signals. The collector electrode of the transistor of the luminance stage 56 is connected to a point at ground potential. The input to the luminance stage 56 is to the base electrode of the transistor of said luminance stage. An output 61 for the red signal is connected to the collector electrode of the transistor of the color output stage 52 at a common point in the connection between said collector electrode and the collector resistor 48. An output 63 for the blue signal is connected to the collector electrode of the transistor of the color output stage 53 at a common point in the connection between said collector electrode and the collector resistor 60. An output 62 for the green signal is connected to the collector electrode of the transistor of the color output stage 54 at a common point in the connection between said collector electrode and the collector resistor 59.

The resistance magnitudes or values of the resistors of the matrix circuit 43 may be determined so that the collector currents of the transistors of the stages 52, 53 and 54 are of identical magnitude. That is, $$Ic52=Ic53=Ic54=I \quad (12)$$

I*c*53 is the collector current of the transistor of the color output stage 53 and I*c*54 is the collector current of the transistor of the color output stage 54.

If the modulation relationship of Equation 1 is provided, $-0.49(R-Y)$ is the signal applied to the base electrode of the transistor of the color output stage 52, $-0.086(B-Y)$ is the signal applied to the base electrode of the transistor of the color output stage 53 and +Y is the signal applied to the base electrode of the transistor of the luminance stage 56. If the internal resistance of each of the luminance stage 56, the color output stage 52, the color output stage 53 and the color output stage 54, and the emitter input resistances of the transistors of said color output stages are disregarded, $$Ri52=Ri53=Ri54=Ri56=0 \quad (13)$$

$$Re52=Re53=Re54=0 \quad (14)$$

wherein *Ri*56 is the internal emitter resistance of the luminance stage 56, *Ri*52 is the internal emitter resistance of the color output stage 52, *Ri*53 is the internal emitter resistance of the color output stage 53, *Ri* 54 is the internal emitter resistance of the color output stage 54, R*e*52 is the emitter input resistance of the transistor of the color output stage 52, R*e*53 is the emitter input resistance of the transistor of the color output stage 53 and R*e*54 is the emitter input resistance of the transistor of the color output stage 54.

This results in the following relationships:

$$V52\ (\text{red})=(I)\cdot(R58) \quad (15)$$

$$V53\ (\text{blue})=(I)\cdot(R60) \quad (16)$$

$$V54\ (\text{green})=(I)\cdot(R59) \quad (17)$$

wherein V52 is the output voltage of the transistor of the stage 52, V53 is the output voltage of the stage 53, V54 is the output voltage of the transistor of the stage 54, R58 is the resistance of the collector resistor 58, R59 is the resistance of the collector resistor 59 and R60 is the resistance of the collector resistor 60.

If the collector current I*c*54 of the transistor of the color output stage 54 is to comprise only the green signal, then $$Ic54=IG=1.7IY-0.51IR-0.194IB \quad (18)$$

wherein IG is the green signal current, IR is the red signal current, IB is the blue signal current and IY is the luminance signal current.

This results in the following relationships:

$$\frac{R48}{R46}=\frac{0.51}{0.49}=1.04 \quad (19)$$

$$\frac{R49}{R47}=\frac{1.194}{0.806}=0.241 \quad (20)$$

$$R48=R44=R49=\frac{Ue56}{I} \quad (21)$$

wherein U*e*56 is the input voltage +Y at the transistor of the luminance stage 56.

Figure 5A:
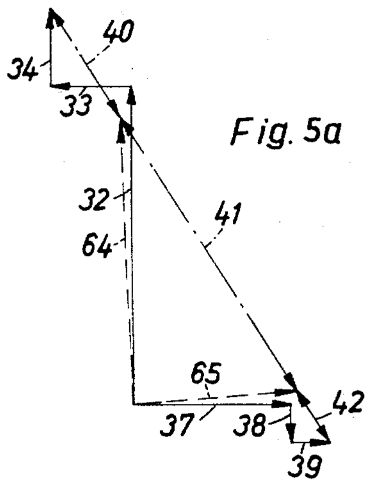
Figure 5B:
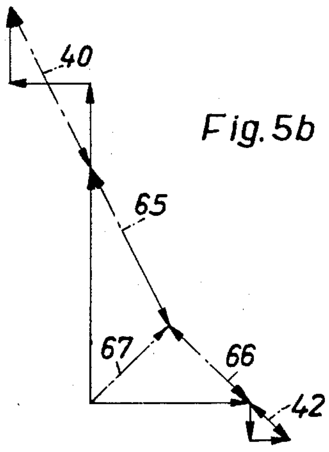

The crosstalk or extraneous signal portion in the circuit of FIG. 4 is very low, although there is no compensation for extraneous signal portions, so that no significant errors occur. The crosstalk depends on the value of the internal emitter resistances R*i*52, R*i*53, R*i*54, R*i*56 respectively of the emitter input resistances R*e*52, R*e*53, R*e*54. If the resistances are zero, there is no crosstalk at all. A remaining error may be almost completely compensated, but not totally eliminated, by a compensating arrangement similar to that illustrated in FIG. 3, as shown in FIG. 5*a*. In such a case, a resistor would be connected from the output 61 to the output 63. Since the output voltages are not of identical magnitude, as shown in FIGS. 5*a* and 5*b* magnified in the ratio of 1 to 2, there are residual deviation output voltages 64 and 65 in the red color signal and in the blue color signal, respectively. The voltages 32, 33, 34, 37, 38, 39, 40, 41 and 42 of FIG. 5*a* correspond to the same voltages of FIG. 3.

Extraneous signal portions may be better compensated in the circuit of FIG. 4 if, instead of a single resistor, a T-type resistance network is connected between the outputs 61 and 63. The resistances of the resistors of the T-type resistance network could then be determined in accordance with the voltages 68 and 66 of FIG. 5*b*, so that such voltages decrease in magnitude at the head resistors 46 and 47 and a voltage 67 is provided across the trunk resistors 44, 48, 49. The amplitude relationships of the output voltages, which is thereby changed, may be compensated such as, for example by a corresponding change of the input voltages.

Compensation for extraneous signal portions may be provided by an additional common resistor of smaller resistance value connected in series with the collector resistors 58 and 60. Still further compensation may be provided by another additional resistor connected from one of the outputs to the additional common resistor.

Compensation for extraneous signal portions may be provided by resistors 69 and 70 in the circuit of FIG. 4. In such an arrangement, the blue color portion, indicated as the voltage 33 in FIG. 5*a*, which appears at the emitter electrode of the transistor of the color output stage 52, is compensated by reverse coupling with a signal applied to the blue color signal output 63 via the resistor 69. The red color portion, indicated as the voltage 38 in FIG. 5*a*, which appears at the emitter electrode of the transistor of the color output stage 53, is compensated by reverse coupling with a signal applied to the red color signal output 61 via the resistor 70.

The embodiment of FIG. 6 corresponds essentially to the embodiment of FIG. 4. The head resistor 47 of FIG. 4 is eliminated in FIG. 6, since the internal resistance of the transistor of the luminance stage 156, which is equivalent to the luminance stage 56 of FIG. 4, together with a resistor 101 has been made so large that the blue color portion applied to the common connection point 155, which is equivalent to the common connection point 55 of FIG. 4, causes a current IB which corresponds to that in Equation 18. Simultaneously, the resistor 101 permits the use of transistors having high magnitude of internal resistance since the variation of such internal resistance may be of small magnitude in the circuit of FIG. 6.

In FIG. 6, in order to provide a suitable DC signal at the outputs from the input of the luminance stage 156, the emitter electrode of the transistor of the color output stage 153 is connected to an intermediate point of a voltage divider 102, 103. One end of the voltage divider 102, 103 is connected to a positive potential of 24 volts applied to a terminal 109 and the other end of said voltage divider is connected to a point at ground potential. T-type resistance networks comprising a trunk resistor 113, a variable head resistor 111 and a head resistor 115, and a trunk resistor 114, a variable head resistor 112 and a head resistor 116 are connected in parallel with operating resistors 159 and 160, respectively. The operating resistors 159 and 160 permit variation of the output voltages without influencing the DC level, particularly the black level. Adjustment or variation of the output voltage permits compensation for tolerances, particularly of the degree of effectiveness of the luminescent materials of the color television tube.

The following magnitudes have been found to be particularly suitable for the components of the circuit of FIG. 6:

| Resistor: | Resistance magnitude |
|---|---|
| 101 | ohms 68 |
| 102 | kilohms 1.3 |
| 103 | do 1.3 |
| 104 | do 1.3 |
| 105 | do 1.2 |
| 113 | do 9 |
| 114 | do 9 |
| 115 | do 12 |
| 116 | do 12 |
| 117 | do 15 |
| 118 | do 3.3 |
| 119 | do 3.3 |
| 120 | do 3.3 |
| 131 | do 30 |
| 144 | ohms 180 |
| 146 | do 620 |
| 148 | do 180 |
| 149 | do 180 |
| 158 | kilohms 8 |
| 159 | do 27 |
| 160 | do 27 |

| Variable resistor: | Maximum resistance magnitude, kilohms |
|---|---|
| 111 | 1 |
| 112 | 1 |

| Transistor: | Type |
|---|---|
| 152 | BF108D |
| 153 | BF108D |
| 154 | BF108D |
| 156 | AFZ10 |

| Condenser: | |
|---|---|
| 106 | Capacitance, 10 microfarads. |
| 107 | $.51(B-Y)$ $(B-Y)=7.25$ volts. |
| 108 | $.51(R-Y)$ $(R-Y)=5.7$ volts. |
| 109 | +24 volts. |
| 110 | $-Y=8.0$ volts, black level at +10 volts. |
| 157 | +230 volts. |
| 161 | 110 volts red. |
| 162 | 88 to 106 volts green. |
| 163 | 88 to 106 volts blue. |

The compensating components for frequency correction are not shown in FIG. 6. The timer or time control component such as, for example, the timer 18 of FIG. 2, not shown in FIG. 6, is utilized for the Y signal and is connected in the input to the luminance stage 156. It may, however, be utilized in place of the resistor 101, in which case it should have a low resistance.

If the voltage divider 102, 103 is to be eliminated, the red color portion 0.299R of Equation 2, which is necessary for the green color signal at the output 162, may be derived from the output of the color output stage 152 and fed to the base electrode of the transistor of the color output stage 154 via a resistor 121. In this case, a resistor 122 should be connected to the base electrode of the transistor of the color output stage 154. Thus, the resistors 102, 103 and 146 may be eliminated from and the resistors 121 and 122 added to the circuit of FIG. 6.

While the invention has been described by means of specific examples and in specific embodiments, I do not wish to be limited thereto, for obvious modifications will occur to those skilled in the art without departing from the spirit and scope of the invention.

What I claim is:

1. A matrix circuit for a color television receiver for providing three basic color signals from two color difference signals each representing a single color relative to a luminance signal, comprising, first color control means for producing a basic first color signal from a first color difference signal and a luminance signal, said first color control means having an input for receiving said first color difference signal, an input-output for providing said first color difference signal and for receiving said luminance signal and an output for providing said basic first color signal;

a second color control means for producing a basic second color signal from a second color difference signal and said luminance signal, said second color control means having an input for receiving said second color difference signal, an input-output for providing said second color difference signal and for receiving said luminance signal and an output for providing said basic second color signal;

a bridge circuit comprising a plurality of resistors connected to each other in a determined network pattern, each of said resistors having a determined resistance value, said bridge circuit producing a basic third color signal from said first and second color difference signals and said luminance signal, said bridge circuit having an input for receiving said luminance signal, a first input-output connected to the input-output of said first color control means for providing said luminance signal to said first color control means and for receiving said first color difference signal from said first color control means, a second input-output connected to the input-output of said second color control means for providing said luminance signal to said second color control means and for receiving said second color difference signal from said second color control means and an output for providing said basic third color signal;

luminance signal means for applying said luminance signal to the input of said bridge circuit;

first color difference signal means for applying said first color difference signal to the input of said first color control means; and second color difference signal means for applying said second color difference signal to the input of said second color control means.

2. A matrix circuit as claimed in claim 1, wherein said luminance signal means provides said luminance signal in a determined magnitude and phase relation to said first and second color difference signals.

3. A matrix circuit as claimed in claim 1, further comprising a resistor connected between the outputs of said first and second color control means for compensating for extraneous color signal portions in said basic color signals due to intercoupling between said first and second color control means.

4. A matrix circuit as claimed in claim 1, further comprising a plurality of T-type resistance networks each comprising head resistors connected to each other and a trunk resistor connected to a common point in the connection between said head resistors, a corresponding one of said T-type resistance networks being connected in the output of said first color control means, in the output of said second color control means and in the output of said bridge circuit for compensating for extraneous color signal portions in said basic color signals.

5. A matrix circuit as claimed in claim 1, further comprising phase shifting means for varying the phase of said first and second color difference signals for compensating for extraneous color signal portions in said basic color signals.

6. A matrix circuit as claimed in claim 1, further comprising a first output resistor connected to the output of said first color control means, a second output resistor connected to the output of said second color control means and an additional common resistor connected in series with said first and second output resistors for compensating for extraneous color signal portions in said basic color signals.

7. A matrix circuit as claimed in claim 6, further comprising another additional resistor connected from one of the outputs of said first and second color control means to said additional common resistor.

8. A matrix circuit as claimed in claim 1, wherein each of said first and second color control means comprises a transistor having an emitter electrode, a base electrode and a collector electrode, the base electrode of each of said transistors comprising the input of the corresponding color control means and the emitter electrode of each of said transistors comprising the input-output of the corresponding luminance control means.

9. A matrix circuit as claimed in claim 8, wherein said first and second color difference signal means apply said first and second color difference signals in 180° phase relation to the luminance signal and said luminance signal means provides said luminance signal in a determined magnitude and phase relation to said first and second color difference signals.

10. A matrix circuit as claimed in claim 1, wherein said luminance signal means comprises a transistor having an operating resistance included in said bridge circuit.

11. A matrix circuit as claimed in claim 1, further comprising time control means connected in the input of said bridge circuit between said luminance signal means and said bridge circuit.

12. A matrix circuit as claimed in claim 8, wherein said luminance signal means comprises a transistor, and further comprising connecting means included in said bridge circuit interconnecting said transistors.

13. A matrix circuit as claimed in claim 1, wherein said first color control means comprises a first color output stage and the output thereof is adapted to be connected to a control grid of a triple beam color television tube and said second color control means comprises a second color output stage and the output thereof is adapted to be connected to another control grid of said triple beam color television tube.

14. A matrix circuit as claimed in claim 1, wherein said first color control means comprises a first color deriving stage and said second color control means comprises a second color deriving stage.

15. A matrix circuit as claimed in claim 13, further comprising a third color output stage connected in the output of said bridge circuit for providing said basic third color signal, said third color output stage having an output adapted to be connected to still another control grid of said triple beam color television tube.

16. A matrix circuit as claimed in claim 15, wherein said third color output stage comprises a transistor having an emitter electrode, a base electrode and a collector electrode, said emitter electrode being connected to said bridge circuit and said collector electrode being adapted to be connected to said color television tube.

17. A matrix circuit as claimed in claim 1, wherein each of said basic first, second and third color signals includes a DC component suitable for control of a triple beam color television tube.

18. A matrix circuit as claimed in claim 1, wherein each of said first and second color control means includes means for amplifying the basic color signals to a determined extent.

19. A matrix circuit as claimed in claim 1, further comprising a first output resistor connected to the output of said first color control means and a second output resistor connected to the output of said second color control means, the resistance values of said first and second output resistors being different from each other.

20. A matrix circuit as claimed in claim 19, further comprising a plurality of T-type resistance networks each comprising head resistors connected to each other and a trunk resistor connected to a common point in the connection between said head resistors, a corresponding one of said T-type resistance networks being connected in the output of said first color control means, in the output of said second color control means and in the output of said bridge circuit for compensating for extraneous color signal portions in said basic color signals.

21. A matrix circuit as claimed in claim 1, wherein each of said first and second color difference signals includes a luminance signal portion and said bridge circuit provides said luminance signal in opposite polarity to said luminance signal portions.

22. A matrix circuit as claimed in claim 1, wherein said bridge circuit comprises first and second T-type resistance networks each comprising a pair of head resistors connected to each other and a trunk resistor connected at one end to a common point in the connection between said head resistors, said trunk resistors being connected to each other at their other ends, one end of each of said pairs of head resistors being connected to one end of the other of said pairs of head resistors, the input of said bridge circuit being connected to a common point in the connection between the pairs of head resistors, the output of said bridge circuit being connected to a common point in the connection between said trunk resistors, the other end of one of said pairs of head resistors being connected to the input-output of said first color control means, and the other end of the other of said pairs of head resistors being connected to the input-output of said second color control means.

23. A matrix circuit as claimed in claim 1, wherein said bridge circuit comprises first and second $\pi$-type resistance networks each comprising a head resistor and a pair of trunk resistors each connected to a different side of the head resistor, one of said trunk resistors being common to both said first and second resistance networks, the ends of said trunk resistors opposite those connected to the sides of the head resistors being connected together, the input of said bridge circuit being connected to a common point in the connection between the trunk resistors, said head resistors being connected to each other at one side of each, the output of said bridge circuit being connected to a common point in the connection between the head resistors, the other side of one of said head resistors being connected to the input-output of said first color control means, and the other side of the other of said head resistors being connected to the input-output of said second color control means.

24. A matrix circuit as claimed in claim 1, wherein said bridge circuit includes variable resistors for independently controlling the amplitudes of said basic color signals.

25. A matrix circuit as claimed in claim 1, wherein said bridge circuit includes variable resistors for compensating for extraneous color signal portions in said basic color signals.

26. A matrix circuit as claimed in claim 1, further comprising a resistor connected between the output of one of said first and second color control means and said bridge circuit for compensating for extraneous color signal portions in said basic color signals.

27. A matrix circuit as claimed in claim 1, further comprising a resistor connected between the output of said first color control means and the input-output of said second color control means and another resistor connected between the output of said second color control means and the input-output of said first color control means for compensating for extraneous color signal portions in said basic color signals.

28. A matrix circuit as claimed in claim 27, wherein said last-mentioned resistor and additional resistor provide color signal portions required to form said basic third color signal.

29. A matrix circuit as claimed in claim 1, further comprising third color control means for producing a basic third color signal from the output of said bridge circuit, said third color control means comprising a transistor having an emitter electrode, a base electrode and a collector electrode, a resistor connected between the outputs of said first and second color control means and the base electrode of the transistor of said third color control means, and means connecting said bridge circuit to the emitter electrode of the transistor of said third color control means for providing said luminance signal to said third color control means.

30. A martix circuit as claimed in claim 1, wherein said luminance signal means includes an internal resistance, said internal resistance providing voltage drops assisting in providing said basic third color signal.

31. A matrix circuit as claimed in claim 1, further comprising third color control means for producing a basic third color signal from the output of said bridge circuit, said first, second and third color control means being connected in parallel relative to operating voltage and being connected in series with said luminance signal means.

32. A matrix circuit as claimed in claim 1, further comprising an output resistor connected to the output of one of said first and second color control means, and a resistance network having a variable resistor connected in parallel with said output resistor for varying the amplitude of the basic color signal and maintaining the DC component level of said basic color signal.

References Cited

UNITED STATES PATENTS

| | | | |
|---|---|---|---|
| 2,927,957 | 3/1960 | Torre | 178—5.4 |
| 2,974,289 | 3/1961 | Cockburn | 178—5.4 XR |

OTHER REFERENCES

RCA Technical Notes, T.N. 46, Baun and Dischert, "Matrix for High Quality Color Television Image Reproduction," Aug. 9, 1957.

ROBERT L. GRIFFIN, *Primary Examiner.*

R. MURRAY, *Assistant Examiner.*